(12) United States Patent
Sigmund et al.

(10) Patent No.: US 7,851,056 B2
(45) Date of Patent: Dec. 14, 2010

(54) ULTRALYOPHOBE INTERFACES

(75) Inventors: Wolfgang M. Sigmund, Gainesville, FL (US); Joachim Spatz, Heidenheim (DE)

(73) Assignee: University of Florida Research Foundation, Inc., Gainesville, FL (US)

( * ) Notice: Subject to any disclaimer, the term of this patent is extended or adjusted under 35 U.S.C. 154(b) by 1523 days.

(21) Appl. No.: 11/149,006

(22) Filed: Jun. 9, 2005

(65) Prior Publication Data

US 2005/0276962 A1 Dec. 15, 2005

Related U.S. Application Data

(60) Provisional application No. 60/578,342, filed on Jun. 9, 2004.

(51) Int. Cl.
*B32B 29/00* (2006.01)
(52) U.S. Cl. ............ 428/295.1; 428/297.4; 428/298.1; 428/403; 428/500; 427/212
(58) Field of Classification Search ................. 428/403, 428/500, 295.1, 297.4, 298.1; 427/212
See application file for complete search history.

(56) References Cited

U.S. PATENT DOCUMENTS

| 3,354,022 | A | 11/1967 | Dettre et al. |
|---|---|---|---|
| 5,147,411 | A | 9/1992 | Topfl |
| 6,203,814 | B1 | 3/2001 | Fisher et al. |
| 6,331,262 | B1 | 12/2001 | Haddon et al. |
| 6,660,363 | B1 | 12/2003 | Barthlott |
| 2002/0122765 | A1 | 9/2002 | Horiuchi et al. |
| 2003/0199392 | A1 | 10/2003 | Jensen |
| 2003/0211129 | A1 | 11/2003 | Spillman, Jr. et al. |

FOREIGN PATENT DOCUMENTS

| CA | 2 260 470 | | 7/1999 |
|---|---|---|---|
| WO | WO2005/005679 | * | 1/2005 |
| WO | WO 2005/056579 A2 | | 1/2005 |

OTHER PUBLICATIONS

Wei Chen et al "Ultahydrophobic . . . " Langmuir 1999, 15, 3395-3399.*
Wong et al., Nanobeam Mechanics: Elasticity, Strength, and Toughness of Nanorods and Nanotubes, Science, 277:1971-1975 (Sep. 26, 1997).
Chen et al., Ultrahydrophobic and Ultralyophobic Surfaces: Some Comments and Examples, Langmuir, 15:3395-3399 (1999).

* cited by examiner

*Primary Examiner*—Leszek Kiliman
(74) *Attorney, Agent, or Firm*—Saliwanchik, Lloyd & Saliwanchik

(57) ABSTRACT

Ultralyophobe interfaces that are substantially inert to contaminants, thereby resulting in surfaces that are hydrophobic and/or lyophobic. The substrates include a substrate surface and have a bonding layer and a plurality of flexible fibers bound to the bonding layer. The flexible fibers have an elastic modulus and an aspect ratio, wherein as the elastic modulus of the fiber increases, the aspect ratio increases such that the flexible fibers bend upon contact of a liquid surface.

23 Claims, 2 Drawing Sheets

ULTRALYOPHOBE INTERFACES

CROSS-REFERENCE TO RELATED APPLICATIONS

This application claims priority to U.S. Provisional Patent Application No. 60/578,342, which was filed Jun. 9, 2004.

STATEMENT REGARDING FEDERALLY SPONSORED RESEARCH OR DEVELOPMENT

Not applicable.

FIELD OF THE INVENTION

The present invention is directed to compositions useful as a coating for a surface. In particular, the present invention is a composition that may be attached to a surface to provide hydrophobic and/or lyophobic properties to the surface.

BACKGROUND OF THE INVENTION

The repair and/or cleaning of surfaces is time-consuming and costly, and there is therefore great economic interest in giving surfaces water and/or dirt repellency properties. Adhesion and/or wetting mechanisms are generally governed by surface-energy parameters between the two contacting surfaces. As a general rule, a system attempts to lower it's free surface energy, generally by means of polar or chemical interactions. Where the free surface energies between two components are already inherently very low, it is generally the case that the adhesion between these two components will be weak, as the sum of the low free surface energies is low. As such, in these instances, it is generally beneficial to lower the free surface energy. In the case of pairings with a high and a low surface energy, a factor is the possibilities for interaction. For example, when water is applied to hydrophobic surfaces, it is not possible to induce any marked lowering of the surface energy. This is evident from the fact that the wetting is poor. Non-stick materials, such as perfluorinated hydrocarbons (e.g. TEFLON®), have a very low surface energy but at the same time have virtually no possibilities of interaction with most other substances, whether they are polar or non-polar. Accordingly, few components adhere to such surfaces, and components that have been deposited on these surfaces may be removed very easily.

Nevertheless, these non-stick materials are not capable of suppressing van der Waals interactions, which generally are always active. Accordingly, the adhesion of a component to such a surface is defined substantially by the contact area: in other words, the smaller the contact area, the less the adhesion.

Nature makes use of this phenomenon in order to achieve very low levels of adhesion with respect to water. Thus cabbage leaves and some types of fruit are covered by small wax bumps which, in the non-wetting case, reduce the van der Waals contact area of a water droplet and thus generally the adhesion of the droplets to the leaves, such that the water droplets do not adhere well. When particles of dirt or dust are enclosed in these water droplets, the particles are carried by the droplets off of the surface. This effect is known as the "Lotus effect" (which is so named due to the wax excretions that occur on lotus leaves). Several prior art references utilize the Lotus-effect for providing self-cleaning surfaces. In some embodiments, these surfaces have a hydrophobic microcrystalline structure with protrusions such that water will not adhere to the surface. When such a surface is contacted by water droplets, the droplets absorb dust particles, which may have settled on the surface, and carry them away.

Oils or surfactants, however, will adhere to such hydrophobic surfaces since the enlargement of the surface area increases the effective van der Waals interface. For this reason, the Lotus-effect cannot be used to produce items that repel fats and oils.

SUMMARY OF THE INVENTION

The invention provides an ultralyophobic interface comprising a substrate surface, and a plurality of flexible fibers bound to the bonding layer. The flexible fibers have an elastic modulus and an aspect ratio, wherein as the elastic modulus of the fiber increases, the aspect ratio increases such that the flexible fibers bend upon contact of a liquid surface.

More particularly, in one embodiment, the present invention provides an ultralyophobic surface having a substrate having a surface, a bonding layer disposed on at least a portion of the surface, and a plurality of flexible fibers bound to the bonding layer; wherein the plurality of fibers each have a length less than about 10 μm; and wherein the flexible fibers have a ratio of elastic modulus to aspect ratio such that the flexible fibers bend on contact with a surface of a liquid.

In another embodiment, the present invention provides method of protecting surfaces, including the steps of providing a substrate having a surface, applying a bonding layer to at least a portion of the surface, and depositing a plurality of flexible fibers that become bound to the bonding layer; wherein the plurality of fibers each have a length less than about 10 μm; and wherein the flexible fibers have a ratio of elastic modulus to aspect ratio such that the flexible fibers bend on contact with a surface of a liquid.

BRIEF DESCRIPTION OF THE DRAWINGS

Other objects, features and advantages of the will become apparent upon reading the following detailed description, while referring to the attached drawings, in which.

DETAILED DESCRIPTION OF THE INVENTION

The present invention provides a substrate having a plurality of flexible fibers thereon. The flexible fibers are designed such that they contact the surface of the polar or non-polar, aqueous or organic liquid and prevent contact of the polar or non-polar, aqueous or organic liquid with the substrate on which the flexible fibers are located. As a result, the flexible fibers help to prevent wetting of the substrate through an effect that may also be referred to as the "plastron effect." As used herein, the "plastron effect" is the mechanical effect wherein the flexible fibers bend on contact with a liquid surface rather than passing through the surface of the liquid and into the liquid. Therefore, the flexible fibers support the liquid away from the substrate surface to thereby prevent wetting of the substrate surface by the liquid. As a result, the plastron effect makes the surface more difficult to wet, thereby enabling these surfaces to repel oil and/or water, as well as any dust or dirt carried by the oil and/or water.

Figure 1:
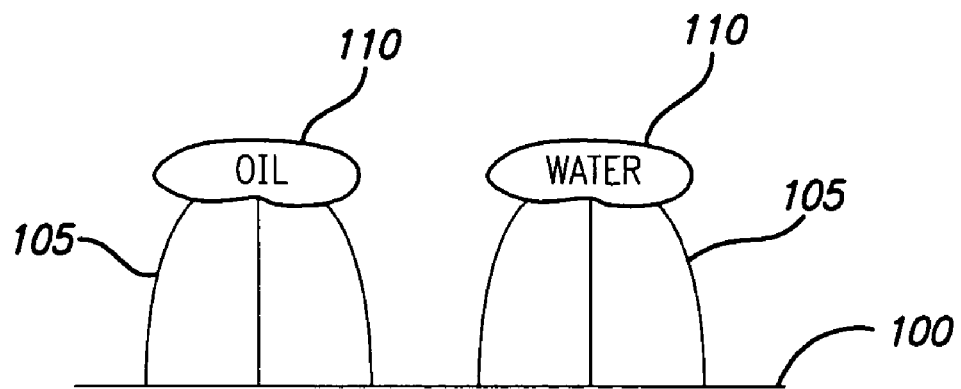
FIG. 1 is a schematic depiction of flexible fibers on a substrate surface according to one embodiment of the present invention.

Accordingly, in one aspect of the present invention, which may be seen in greater detail in FIG. 1, the present invention provides a substrate surface 100 having a plurality of flexible fibers 105 located on the substrate surface 100 and positioned to bend upon contact of liquid surface 110 to prevent contact of the liquid surface 110 with the substrate surface 100. As a result, the liquid 110 does not contact the substrate 100 and therefore does not wet the substrate surface 100, thereby providing hydrophobic and/or lyophobic properties to the substrate surface 100.

Figure 2:
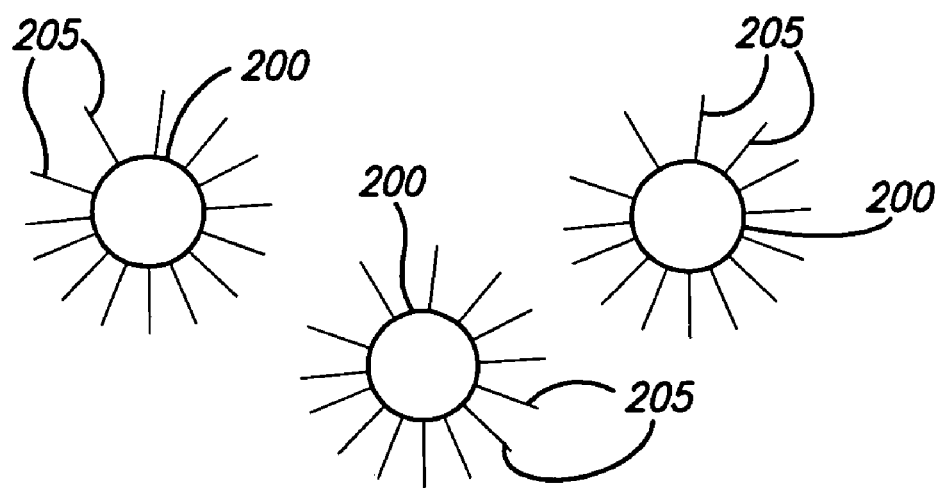
FIG. 2 is a schematic depiction of flexible fibers on a particle surface according to another embodiment of the present invention.
Figure 3:
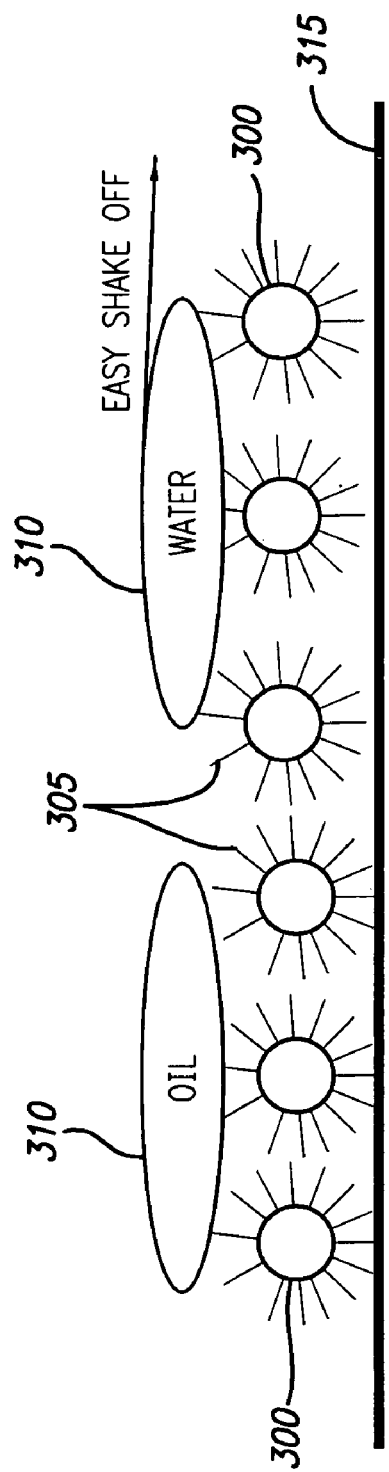
FIG. 3 is a schematic depiction of flexible fibers on a particle, on a substrate surface according to yet another embodiment of the present invention.

In another aspect, which may be seen in greater detail in FIG. 2, the present invention provides a particle 200, such as a silica particle, having a plurality of flexible fibers 205 located on the surface of the particle 200 and positioned to bend upon contact of a liquid surface to prevent contact of the liquid surface with the particle surface 200. As a result, the liquid does not contact the particle surface and therefore does not wet the particle surface. In a related embodiment, which may be seen in greater detail in FIG. 3, particles 300 have a plurality of flexible fibers 305 located on the surface of the particle 300, the fibers 305 are positioned to bend upon contact of liquid surface 310 to prevent contact of the liquid surface 310 with the particle surface 310. The particles 300 are attached to a substrate 315. The particles 300 having the flexible fibers 305 thereon provide protection to the underlying substrate 315 as the flexible fibers 305 and particles 300 will substantially prevent the liquid 310 from contacting the underlying substrate 315.

Accordingly, the present invention, in one embodiment, provides for the use of flexible fibers that are selected such that they bend upon contact with a liquid surface, rather than pierce through the surface and pass into the body of the liquid. In another aspect, the flexible fibers are positioned on the substrate in an orientation and/or a fiber density such that they are capable of preventing contact of the liquid with the surface of the substrate. In still another aspect, the flexible fibers may be selected based upon the liquid that is being repelled from the substrate.

Accordingly, one factor to be considered is the selection of a fiber material capable of bending upon contact with a liquid surface. This factor may be based on the elastic modulus of the material used to form the flexible fiber in relation to the aspect ratio of the fiber. As the elastic modulus of a fiber decreases, it becomes easier to bend. Since materials that are easier to bend are better able to bend upon contact with a liquid surface, these materials may be used to form fibers that are shorter in length respective to the diameter of the fiber.

Therefore, in one embodiment of the present invention, the flexible fibers are composed of materials selected to have a low elastic modulus materials relative to the aspect ratio of the flexible fiber. As used herein, the "aspect ratio" is the ratio of fiber length to fiber diameter. Based upon the elastic modulus of the material used to form flexible fiber, the resulting aspect ratio may be very low, such as from about 1 to about 25 in those embodiments wherein the flexible fibers are composed of a material having an elastic modulus of from about 0.1 to about 20 megaPascal.

As the elastic modulus increases, so would the resulting aspect ratio. For example, in those embodiments wherein the elastic modulus of the material is about 10 gigaPascal, a suitable aspect ratio of the fiber could be about 650. In those embodiments wherein the elastic modulus of the material is about 100 gigaPascal, a suitable aspect ratio of the fiber could be greater than about 6000. In those embodiments wherein the elastic modulus of the material is about 1 teraPascal, a suitable aspect ratio of the fiber could be greater than about 200,000.

Another factor to be considered in constructing the ultralyophobic substrates of the present invention is the orientation and/or density of the flexible fibers on the substrate. As the fibers are selected such that they bend upon contact with a liquid surface, the flexible fibers are, in one embodiment, oriented such that they are substantially perpendicular to the substrate surface. In an alternative embodiment, the flexible fibers are oriented such that they are angled with respect to the substrate surface. In yet another alternative embodiment, the flexible fibers are angled rather than being straight or substantially straight. As such, these fibers already include a bend in the fiber prior to contact with the surface of the liquid such that a greater surface area of the fiber is able to contact the liquid surface. In regards to the density of the flexible fibers on the substrate, the fibers should be placed in an amount such that they are capable of preventing contact of a liquid surface with a substrate surface. As such, higher densities of fibers are preferred, although actual densities of fibers may vary based on other factors, such as the diameter of the fibers. In one embodiment, the density of the fibers on the substrate is greater than about 100 fibers per square centimeter, and, in alternative embodiments, greater than 1000 fibers per square centimeter. In still other embodiments, the density of the fibers on the substrate is greater than about 10,000 fibers per square centimeter. However, it is to be understood that based on the type of fiber used and the diameter of the fiber, in some embodiments, less than 100 fibers per square centimeter may be used.

Yet another factor to be considered in constructing the ultralyophobic substrates of the present invention is the liquid that is to be prevented from contacting the substrate surface. Different liquids have different surface tensions, and the selection of the flexible fiber may include a determination of particular fibers that are better enabled to prevent wetting of particular liquids, with the surface tension of the liquid factoring into the selection of the flexible fiber. In general, as the surface tension of the surface of the liquid decreases, the elastic modulus of the flexible fiber material may also decrease.

Accordingly, as may be seen, the flexible fibers may be formed from many suitable materials, with higher elastic modulus materials having higher aspect ratios than lower elastic modulus materials. If a higher elastic modulus material is used, however, the resulting aspect ratio must be higher, and the relationship between the elastic modulus of the fiber and the aspect ratio is not linear. Examples of materials that may be used to form the flexible fibers in the present invention include, but are not limited to, metal fibers, rubber fibers, polymer fibers, ceramic fibers, carbon fibers, or a combination thereof. The flexible fibers may also be in the form of solid fibers or may be in the form of tubes, such as nanotubes.

Examples of polymer materials that may be used to form flexible fibers in the present invention include, but are not limited to, nylon; elastomers; engineering polymers such as plastics, polyamides, polyimides, polysulfones, and polyesters; plasticized polyvinyl chloride (PVC), poly(methyl methacrylate) (PMMA), and silicone. Metals that may be used to form the flexible fibers include, but are not limited to, gold, silver, copper, tin, zinc, aluminum, or the like. Polymeric materials that may be used to form the flexible fibers include, but are not limited to, polyethylene, polypropylene, polyvinyl alcohol, polyethylene glycol, polyvinyl chloride, or the like. Ceramic materials that may be used to form the flexible fibers include, but are not limited to, alumina, graphite, silicon, ceria, zirconia, glass, silicon carbide, silicon nitride, sapphire, cordierite, mullite, magnesium oxide, zirconium oxide, boron carbide, scandium oxide, hafnium oxide, yttrium oxide, spinel, garnet, boron nitride, or quartz.

The length of the flexible fibers may vary, again depending on the aspect ratio and elastic modulus of the fibers. In one embodiment, the fibers are less than about 10 μm in length. In another embodiment, the fibers are less than about 1 μm in length. In yet another embodiment, the fibers are less than about 100 nm in length.

In one embodiment, the flexible fibers may be nanotubes of a selected material that are attached to the surface of interest. Nanotubes are cylinder-shaped structures (a nanometer is one millionth of a millimeter). The nanotubes may be composed of a variety of different materials. The nanotubes used in the present invention may be any material capable of increasing the contact angle of a surface by preventing wetting of that surface. Examples of materials useful in the present invention include, but are not limited to, carbon, gold, or other metals, inorganic materials such as silica or alumina, or a combination thereof. In particularly select embodiments of the present invention, the nanotubes are carbon nanotubes.

The present invention may also utilize a bonding material to bond the flexible fibers to the substrate. In one embodiment, the bonding layer remains on the substrate after placement of the flexible fibers. In another embodiment, the bonding layer is removed from the substrate after placement of the flexible fibers. The bonding material may be any material capable of bonding the flexible fibers to a substrate and may be selected based on one or more factors including, but not limited to, the substrate used, the flexible fibers used, the selected orientation of the flexible fibers on the substrate, and/or whether the bonding material is to remain on the substrate. Examples of bonding materials that may be used in the present invention include, but are not limited to, adhesive materials, polycationic materials, anionic materials, cationic materials, or a combination thereof.

In one embodiment, a cationic polymer may be used as the bonding layer. Cationic polymers are materials that have a positive charge. As such, cationic polymers may be used as the bonding material when the flexible fibers have a negative charge associated with them, such that the flexible fibers bond to the cationic polymer through the opposite charges. The charge of the cationic polymer could also be a partial charge. Cationic polymers that may be used in the present invention include, but are not limited to, polymeric organic compounds, and metal salts. In one version of the present invention, the cationic compounds are organic cationic polymers that include two or more carbon atoms.

Organic cationic polymers may also be used as the bonding layer in the present invention, including, but not limited to, nitrogen-containing and phosphorus-containing materials. Nitrogen-containing cationic materials include, but are not limited to, various primary amines (such as polyvinylamine or polyallyamine), secondary amines, tertiary amines, quaternary amines, and amines converted to cationic amines under acidic conditions. Examples of nitrogen containing cationic polymer materials include homopolymers or copolymers of cationic monomers. Cationic monomers can include diallyldimethylammonium chloride, or methacrylamidopropyltrimethyl ammonium chloride, or the like. Phosphorus-containing cationic materials include, but are not limited to, the phosphonium group. Examples of a phosphonium group cationic material include stearyltributyl phosphonium bromide, or the like.

In an alternative embodiment, an anionic polymer is used for the bonding layer. Anionic polymers are materials that have a negative charge. As such, anionic polymers may be used as the bonding material when the flexible fibers have a positive charge associated with them, such that the flexible fibers bond to the anionic polymer through the opposite charges. The anionic polymer may be any polymeric compound having a single unit that repeats in the compound, on average at least five times, a plurality of anionic groups and a molecular weight of at least 400 kiloDalton, preferably at least 600 kiloDalton. The anionic polymer may have negatively charged groups that may be present in the repeating group and/or at one or both of the ends of the polymer chain and may be introduced during polymerisation or after the polymer has been formed. The anionic polymer may contain cationic groups as well as anionic groups but the net charge on the polymer chain must be negative. The anionic polymer may be wholly or partly amphoteric, provided that it is capable of having a net negative charge in the presence of the cationic polymer. It alternative embodiments, the anionic polymer includes anionic groups that are oxo-anions of sulphur, carbon or phosphorus, or derivatives thereof such as, for example sulphonate ($SO_3^-$) and carboxylate ($CO_2^-$) groups.

In an alternative embodiment, the substrate may have two separate and oppositely charged bonding layers. In this embodiment, the two electrolyte layers may be added in any manner provided the outer layer, to which the flexible fibers will be attached, has an affinity for the particular flexible fibers. For example, in an embodiment having a poly(sodium 4-styrenesulfonate) (PSS) layer and using carbon nanotubes as the hairs, as it is difficult to attach carbon nanotubes on a surface having a PSS layer due to electric repulsions between them, carbon nanotubes may be deposited on a PDAC/PSS/PDAC multi-layer surface, provided the PDAC (poly(diallyldimethylammonium chloride)) layer is the external layer.

In another alternative embodiment, the bonding layer may include an adhesive material. Examples of adhesive materials that may be used in the present invention include, but are not limited to, rubber cements, mastics, pressure sensitive adhesives, acrylics, vinyl acetates, ethylene vinyl acetates, vinyl acrylics, styrene monomers and copolymers, neoprene latexes, nitrile latexes, or natural rubber latexes. Additionally, adhesives which have been fortified with terpenes, terpene phenolics, rosen esters and other tackifying additives may also be used.

In still another alternative embodiment, no bonding layer may be used and the flexible fibers may be formed by integrating the flexible fibers directly with the substrate, such as by inserting the fibers directly into the substrate or by otherwise mechanically integrating the fibers with the substrate. In yet another alternative embodiment the flexible fibers may be formed having a varying elastic modulus profile along the length of the fiber. For example, the fiber may have a higher modulus at one end to permit insertion into the substrate while the free end has a lower modulus such that the fiber bends more readily. Conversely, the bonding layer may comprise the substrate as well, such as those embodiments wherein a bundle of flexible fibers are bound to one another using a drop of adhesive material. In this embodiment, the drop of adhesive acts as both the substrate and the bonding layer.

Figure 4:
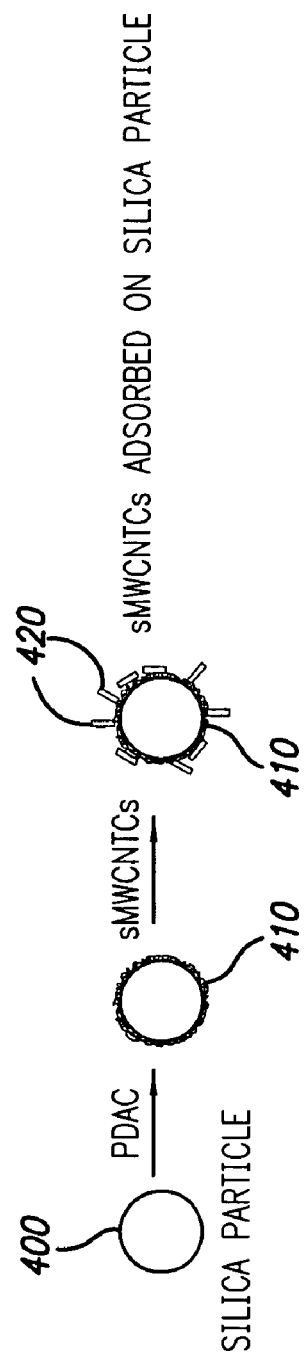
FIG. 4 is a schematic of a method of making particles according to one embodiment of the present invention.

Reference is now made to one embodiment of the present invention as shown in FIG. 4. FIG. 4 is a schematic of one embodiment of a method of forming a substrate having a plurality of flexible fibers according to aspects of the present invention and showing a silica particle 400 that is coated with polyelectrolytes. In the method, the silica particle is coated with a polyelectrolyte 410 having a positive charge to create a coating having a positive charge. In this example, the polyelectrolyte is PDAC. Next, carbon nanotubes are adsorbed onto the silica particle 420 to form the materials having carbon nanotube arrays thereon of the present invention. The negatively-charged carbon nanotubes self-assemble themselves in a substantially perpendicular orientation. This is due to the negatively charged carboxyl groups of the carbon nanotubes and the positively-charged polyelectrolyte layer. It is to be understood, however, the selection of the polyelectrolyte layer should take into account the material to be used to increase the bonding and/or orientation of the flexible fibers on the substrate surface area.

Accordingly, this embodiment uses carbon nanotubes that are self-assembled on a polyelectrolyte layer. In one embodiment, multi-wall carbon nanotubes (MWCNT) are used, though in select embodiments, single-wall carbon nanotubes may also be used. Carbon nanotubes may be produced by a chemical oxidation technique to introduce carboxylic groups at the open ends of the nanotubes. The carboxylated carbon nanotubes may be adsorbed on a poly(diallyldimethylammonium chloride) (PDAC) or other suitable electrolyte layer at a pH of from about 6 to about 7, and in select embodiments at a pH of 6.5. The carbon nanotubes may be produced by a variety of different methods such as chemical oxidation or sonication in the presence of sulfuric acid, nitric acid, or a combination thereof to form carbon nanotubes having carboxylic groups at the open ends of the carbon nanotubes.

Once the carbon nanotubes have been formed, they may then be self-aligned on a bonding layer. In one embodiment, the bonding layer is a polyelectrolyte layer. In this embodiment, the polyelectrolyte layer is a polycationic polymer layer, such as a poly (diallyldimethylammonium chloride) (PDAC) layer adsorbed on a substrate, such as a silicon wafer. In this embodiment, the carboxylate anion groups of carbon nanotubes may be bound on an oppositely-charged PDAC layer. In general, any cationic or anionic polymer may be used in the present invention to provide a positively or negatively charged surface to which the nanotubes may be bound in those embodiments wherein the flexible fibers may be bound to the substrate surface using the charge characteristics of the flexible fiber and the bonding layer.

In an embodiment wherein the substrates are particles and have a plurality of flexible fibers thereon, these may be applied in any suitable manner, such as by including these materials in paints or any other liquid or powder base, and then applying the particles having the flexible fibers thereon using any known method, such as spraying, dipping, immersing, coating or otherwise contacting the surface to be treated.

In an alternative embodiment, particles having nanotubes attached thereto may be used in conjunction with a surface having a dirt and/or water repellent characteristic. In these embodiments, additional materials may be applied to the substrate and/or particle to enhance the hydrophobic and/or lyophobic aspects of the present invention. For example, in one embodiment, a non-stick material, such as polytetrafluroethylene (PTFE) may be used in addition to the flexible fibers.

The present invention may be used in the production of self-cleaning and/or non-wetting surfaces. The substrates used in the present invention may be particles or any substrate surface that is desired to be rendered more repellant to any polar or non-polar, aqueous or organic liquid. For example, the present invention may be utilized in paints or other surface coatings that may be used on objects such as automobiles and buildings. As such, these objects may be easily cleaned and/or will remain clean for extended periods of time despite intrusion from water, oil or other liquids. In addition, when applied to buildings, these coatings may protect the buildings from water, oil, and/or spray-paints (thereby providing an anti-graffiti surface to the building). Objects, such as subway trains and the like, may also be protected from graffiti using the present invention. The coatings may be applied to glass to produce self-cleaning windows or windshields that repel water, oil and/or mud. In addition, in alternative embodiments, the materials of the present invention may be integrated with clothing or other woven or nonwoven fabrics to produce a material that is resistant to stains from polar or non-polar, aqueous or organic liquids.

EXAMPLES

This example is provided to show the formulation of flexible fibers comprising carbon nanotubes. Multi-wall carbon nanotubes (MWCNT) were synthesized by arc-discharge method. Si(100) wafers were obtained from Montco Silicon Technologies Inc. (Spring City, Pa.). All following materials were obtained from Aldrich (St. Louis, Mo.) and used as received: poly (diallyldimethylammonium chloride) (PDAC, 20 wt % in water, molecular weight 400,000-500,000), poly (sodium 4-styrenesulfonate) (PSS, molecular weight 70,000), sodium chloride (NaCl, 99+%), hydrochloric acid (HCl, 36%), sulfuric acid ($H_2SO_4$, 98%) and nitric acid ($HNO_3$, 70%).

MWCNT raw soot was heated in the presence of air at 600° C. for 2 hours, and then soaked in hydrochloric acid for 24 hours and centrifuged. The precipitate was rinsed with deionized water 3 times and dried under the nitrogen gas. MWCNTs were chemically shortened by sonification in a mixture of sulfuric acid and nitric acids (3:1) for 8 h. The resulting MWCNTs were washed with deionized water and separated by centrifuging 3 times. After being dried in a nitrogen stream, MWCNT were dispersed using deionized water.

PDAC and PSS were dissolved in deionized water at a concentration of 2.0 mg/2 mL, containing 0.01 M NaCl for layer by layer assembly. A Si(100) wafer was diced into $0.6 \times 0.6$ cm² pieces and cleaned by sonification in acetone for 30 min and then rinsed with methanol and the deionized water.

Briefly, a silicon substrate was coated with the prepared PDAC solution with 10 min waiting time to adsorb the polycationic layer. MWCNTs were immobilized on the substrate by immersing substrates into the MWCNTs solution for several hours. To obtain a multilayer, PDAC modified substrates were dip-coated into a PSS solution also allowing 10 min for adsorption. The modified substrates were rinsed using deionized water throughout. These steps were repeated until the selected layers were obtained. Finally, the MWCNTs aligned substrate was rinsed with deionized water and dried under a nitrogen atmosphere.

MWCNTs were observed using a Field-Emission Scanning Electron Microscope (FE-SEM, 6335F, JEOL) and an Atomic Force Microscopy (AFM, DIMENSION 3100, Digital Instrument (Woodbury, N.Y.)) by tapping mode measurement with silicon cantilevers in the ambient condition.

MWCNTs were produced by the chemical oxidation method. These MWCNTs were well dispersed in water, ethanol and other solvents without surfactants. Like a shortened single wall carton nanotube (SWCNT) suspensions, a homogeneous MWCNT suspension was stabilized without precipitation for 24 hours. The carboxylic groups at the ends of MWCNTs were verified by FT-IR giving stretching bands of carboxylic groups at 1700 cm$^{-1}$. Most of the MWCNTs had a diameter of 10-15 nm and were 20-170 nm in length. The length distribution of MWCNTs was measured from MWCNTs by FE-SEM picture analysis of 5 samples with 3 pictures each. A total of 600 MWCNTs were evaluated. These dimensions correspond with the size of MWCNTs observed by the AFM.

The relations between poly ions and functionalized groups on the surface were researched by using the chemical force microscopy. Carboxylic groups had a strong adhesion force with amine groups in deionized water (pH 6.5). This reaction was used to adsorb PDAC in synthesizing multilayer templates. Carboxylic groups at the open ends of MWCNTs were bound on the silver substrate via Coulombic forces. Using these principles, the carboxylate anion groups of MWCNTs adsorbed on the oppositely charged polycationic PDAC by Coulombic attractions. A range of height rationalizes that the orientation of MWCNTs is perpendicular to the surface layer. It is believed that the lateral elastic deformation of the nanotubes and tilt angles on the surface result in the difference between the length of MWCNTs by FE-SEM and the height of MWCNTs on the surface. The range of lateral dimensions observed by AFM varied from several tens of nanometers to 250 nm. These results were attributed to the aggregation of MWCNTs due to van der Waals interaction between MWCNTs, and furthermore the limits of convolution of the AFM tip and the lateral elastic deformation as has been shown for MWCNTs self assembled on gold and silver substrates.

In summary, MWCNTs may be used, in one embodiment, as the flexible fibers to form a self-assembled layer on a polycationic PDAC layer by electrostatic attraction. These results imply that the patterns of carbon nanotubes may be manipulated by patterned multilayer templates.

Although the illustrative embodiments of the present disclosure have been described herein with reference to the accompanying drawings and examples, it is to be understood that the disclosure is not limited to those precise embodiments, and various other changes and modifications may be affected therein by one skilled in the art without departing from the scope of spirit of the disclosure. All such changes and modifications are intended to be included within the scope of the disclosure as defined by the appended claims. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

What is claimed is:

1. A lyophobic surface, comprising:
   a substrate having a surface;
   a bonding layer disposed on at least a portion of the surface; and
   a plurality of flexible fibers bound to the bonding layer;
   wherein the plurality of fibers are oriented such that the fibers are angled with respect to the surface of the substrate;
   wherein the plurality of fibers each have a length less than about 10 μm;
   wherein the flexible fibers have a ratio of elastic modulus to aspect ratio of about 1 to about 20 MPa such that the flexible fibers bend on contact with a surface of a liquid rather than passing through the surface of the liquid and into the liquid.

2. The lyophobic surface of claim 1, wherein the bonding layer is selected from a cationic polymer, an anionic polymer, an adhesive, or a combination thereof.

3. The lyophobic surface of claim 1, wherein the flexible fibers are selected from metal fibers, ceramic fibers, polymeric fibers, rubber fibers, carbon nanotubes, or a combination thereof.

4. The lyophobic surface of claim 1, wherein the flexible fibers are hollow fibers.

5. The lyophobic surface of claim 1, wherein the substrate comprises a plurality of particles.

6. The lyophobic surface of claim 5, wherein the plurality of particles comprises silica.

7. The lyophobic surface of claim 5, wherein the plurality of particles comprises bundles of flexible fibers bound together by adhesive material.

8. The lyophobic surface of claim 5, further comprising a base substrate material, wherein the plurality of particles is disposed on the base substrate material.

9. The lyophobic surface of claim 1, further comprising a non-stick material intermixed with the flexible fibers disposed on said bonding layer.

10. A method of forming a substrate having a lyophobic surface, comprising the steps of:
    providing a substrate having a surface;
    applying a bonding layer to at least a portion of the surface; and
    depositing a plurality of flexible fibers that become bound to the bonding layer;
    wherein the plurality of fibers are oriented such that the fibers are angled with respect to the surface of the substrate;
    wherein the plurality of fibers each have a length less than about 10 μm;
    wherein the flexible fibers have a ratio of elastic modulus to aspect ratio of about 1 to about 20 MPa such that the flexible fibers bend on contact with a surface of a liquid rather than passing through the surface of the liquid and into the liquid.

11. The method of claim 10, wherein the bonding layer is selected from a cationic polymer, an anionic polymer, an adhesive, or a combination thereof.

12. The method of claim 10, wherein the flexible fibers are selected from metal fibers, ceramic fibers, polymeric fibers, rubber fibers, carbon nanotubes, or a combination thereof.

13. The method of claim 10, wherein the flexible fibers are hollow fibers.

14. The method of claim 10, wherein the substrate comprises a plurality of particles.

15. The method of claim 14, further comprising a base substrate material, wherein the plurality of particles is disposed on the base substrate material.

16. A lyophobic surface, comprising:
    a substrate having a surface; and
    a plurality of flexible fibers bound to at least a portion of the surface;
    wherein the plurality of fibers are oriented such that the fibers are angled with respect to the surface of the substrate;
    wherein the plurality of fibers each have a length less than about 10 μm;
    wherein the flexible fibers have a ratio of elastic modulus to aspect ratio of about 1 to about 20 MPa such that the flexible fibers bend on contact with a surface of a liquid rather than passing through the surface of the liquid and into the liquid.

17. The lyophobic surface of claim 16, wherein the flexible fibers are selected from metal fibers, ceramic fibers, polymeric fibers, rubber fibers, carbon nanotubes, or a combination thereof.

18. The lyophobic surface of claim 16, wherein the substrate comprises a plurality of particles.

19. The lyophobic surface of claim 18, further comprising a base substrate material, wherein the plurality of particles is disposed on the base substrate material.

20. A method of forming a substrate having a lyophobic surface, comprising the steps of:
   providing a substrate having a surface;
   applying a bonding layer to at least a portion of the surface;
   depositing a plurality of flexible fibers that become bound to the bonding layer; and
   removing the bonding layer whereby the plurality of flexible fibers remain attached to the portion of the surface;
   wherein the plurality of fibers are oriented such that the fibers are angled with respect to the surface of the substrate;
   wherein the plurality of fibers each have a length less than about 10 μm;
   wherein the flexible fibers have a ratio of elastic modulus to aspect ratio of about 1 to about 20 MPa such that the flexible fibers bend on contact with a surface of a liquid.

21. The method of claim 20, wherein the bonding layer is selected from a cationic polymer, an anionic polymer, an adhesive, or a combination thereof.

22. The method of claim 20, wherein the flexible fibers are selected from metal fibers, ceramic fibers, polymeric fibers, rubber fibers, carbon nanotubes, or a combination thereof.

23. The method of claim 20, wherein the bonding layer is removed by applying heat to the surface.

* * * * *